US010409664B2

(12) United States Patent
Malecki et al.

(10) Patent No.: US 10,409,664 B2
(45) Date of Patent: Sep. 10, 2019

(54) OPTIMIZED INCIDENT MANAGEMENT USING HIERARCHICAL CLUSTERS OF METRICS

(71) Applicant: International Business Machines Corporation, Armonk, NY (US)

(72) Inventors: Bartlomiej Malecki, Slomniki (PL); Piotr Padkowski, Lodz (PL); Marek Peszt, Kraków (PL); Piotr Józef Walczak, Kraków (PL)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 15/661,094

(22) Filed: Jul. 27, 2017

(65) Prior Publication Data

US 2019/0034263 A1    Jan. 31, 2019

(51) Int. Cl.
*G06F 11/00* (2006.01)
*G06F 11/07* (2006.01)
(Continued)

(52) U.S. Cl.
CPC ............ *G06F 11/0775* (2013.01); *G06F 7/08* (2013.01); *G06F 7/24* (2013.01); *G06F 11/0709* (2013.01);
(Continued)

(58) Field of Classification Search
CPC ..... G06F 7/08; G06F 7/22; G06F 7/24; G06F 11/0709; G06F 11/0769; G06F 11/0757;
(Continued)

(56) References Cited

U.S. PATENT DOCUMENTS 8,712,370 B2    4/2014  Ryan
8,826,077 B2 *  9/2014  Bobak ................. G06F 11/0709
                                                            714/26
(Continued)

FOREIGN PATENT DOCUMENTS

CN           105631196 A    6/2016

OTHER PUBLICATIONS

"Hierarchical clustering—Wikipedia" Sep. 16, 2016.
(Continued)

*Primary Examiner* — Marc Duncan
(74) *Attorney, Agent, or Firm* — Edward Li

(57) ABSTRACT

A method, a computer system, and a computer program product for clustering operational parameter values in a micro-service architecture used in a computing infrastructure. The computer system measures a plurality of operational parameter values of elements of the computing infrastructure and logs identifiers for elements having caused a problem situation and related problem resolution times. The computer system clusters the operational parameter values of the elements having caused the problem situation, according to a correlation function. The computer system orders the operational parameter values within a cluster and the elements having caused the problem situation. The computer system periodically performs the clustering and the ordering such that a sequence of the operational parameter values and the elements having caused the problem situation is indicative of a resolution time required for a new problem situation.

18 Claims, 7 Drawing Sheets

(51) Int. Cl.
*G06F 7/08* (2006.01)
*G06F 7/24* (2006.01)

(52) U.S. Cl.
CPC ........ *G06F 11/079* (2013.01); *G06F 11/0757* (2013.01); *G06F 11/0769* (2013.01)

(58) Field of Classification Search
CPC .............. G06F 11/0775; G06F 11/079; G06F 11/3072; G06F 11/3086; G06F 11/3409; G06F 16/244; G06F 16/24578; G06F 16/2465; G06F 16/248; G06F 16/345; G06F 16/35; G06F 16/355; G06F 16/358; G06F 16/381; G06Q 10/063; G06Q 10/0639; G06Q 10/063114; G06Q 10/20
See application file for complete search history.

(56) References Cited

U.S. PATENT DOCUMENTS

| | | | | |
|---|---|---|---|---|
| 8,904,242 | B2* | 12/2014 | Machida | G06F 11/008 |
| | | | | 714/47.3 |
| 9,244,766 | B2* | 1/2016 | Patapoutian | G06F 11/1048 |
| 2008/0155564 | A1* | 6/2008 | Shcherbina | G06Q 10/04 |
| | | | | 719/318 |
| 2013/0238939 | A1* | 9/2013 | Chalmers | G06F 11/3688 |
| | | | | 714/38.1 |
| 2013/0304904 | A1 | 11/2013 | Mouline | |
| 2016/0104125 | A1* | 4/2016 | Chapman | G06Q 10/20 |
| | | | | 705/305 |
| 2016/0110268 | A1* | 4/2016 | Sekiguchi | G06F 12/023 |
| | | | | 714/15 |
| 2016/0269482 | A1 | 9/2016 | Jamjoom | |
| 2016/0274962 | A1* | 9/2016 | Fortune | G06F 11/079 |
| 2018/0143868 | A1* | 5/2018 | Johnston | G06F 11/0721 |

OTHER PUBLICATIONS

Yanggratoke et al. "Predicting service metrics for cluster-based services using real-time analytics" Jun. 8, 2015.
Mell et al. "The NIST Definition of Cloud Computing Recommendations of the National Institute of Standards and Technology" Special Publication 800-145. Sep. 2011. Gaithersburg, MD.

* cited by examiner

OPTIMIZED INCIDENT MANAGEMENT USING HIERARCHICAL CLUSTERS OF METRICS

BACKGROUND

The present invention relates generally to clustering operational parameter values, and more particularly to enabling problem resolution in a micro-service architecture used in a cloud computing system.

Today's computing landscape, in large enterprises or as part of the operation of a service provider, comprises a plurality of large networked computing resources with a large plurality of physical and virtual machines, software defined infrastructure components (e.g., software-defined storage, software defined networking) serving as a basis for a large number of interconnected micro-services. Such landscapes are difficult to maintain, especially because these days many micro-services provide functionality conforming to strict service level agreements (SLA).

Computing landscapes are very often implemented as cloud computing environments in which application functionality is decomposed into a set of collaborating micro-services, each of which may be scaled, upgraded, and managed independently by different developers. Since multiple networked micro-services work in cooperation, e.g., called each other's services, to generate a response to a user's request, guaranteeing an end-to-end view of the application execution becomes quite difficult. In particular, in case a problem situation, i.e., an error, a performance problem, or the like, arises. Isolating root causes for individual performance degradation or malfunctions in a production environment becomes a real challenge.

One of the key performance indicators for the operation staff of such cloud computing data centers running a large plurality of end-user applications is often the time to resolve an issue or incident. A highly sophisticated problem resolution approach requires more than a near real-time monitoring of elements of the cloud computing environment, like physical servers, virtual machines, storage systems, networking, and routing components, etc. Typical enterprise applications are more and more composed of hundreds of instances of heterogeneous micro-services. With developers constantly improving or adding new features to those micro-services and deploying them directly as production instances (under a DevOps approach), performance regressions are no longer a rarity. As the development of the applications and micro-services grows and diversifies over time, multiple versions of an application workflow and respective micro-services begin to coexist. Efficiently managing application performance in such polymorphic environments is pertinent for maintaining the end-user experience while interacting with the applications.

The expectation of end-users increases constantly in terms of problem resolution times, so that they can efficiently support their personal and enterprise goals. It is no longer sufficient to log performance parameters and potentially display them on displays of the system management console. In fact, operating and problem resolution staff has the same growing expectations in terms of computerized support for resolving occurring problem situations in the cloud computing environments. They expect more than nameless lists of operational parameters but direct insight and guidance how to repair broken systems.

SUMMARY

In one aspect, a method for clustering operational parameter values in a micro-service architecture used in a computing infrastructure is provided. The method comprises measuring a plurality of operational parameter values of elements of the computing infrastructure. The method further comprises logging identifiers for elements having caused a problem situation and related problem resolution times. The method further comprises clustering the operational parameter values of the elements having caused the problem situation, according to a correlation function between the operational parameter value and the problem resolution times. The method further comprises ordering the operational parameter values within a cluster and the elements having caused the problem situation, according to the problem resolution times of the elements having caused the problem situation. The method further comprises periodically performing the clustering and the ordering such that a sequence of the operational parameter values and the elements having caused the problem situation is indicative of a resolution time required for a new problem situation.

In another aspect, a computer system for clustering operational parameter values in a micro-service architecture used in a computing infrastructure is provided. The system comprises a measurement unit configured to measure a plurality of operational parameter values of elements of the computing infrastructure. The system further comprises a logging module configured to log identifiers for elements having caused a problem situation and related problem resolution times. The system further comprises a clustering unit configured to cluster the operational parameter values of the elements having caused the problem situation, according to a correlation function between the operational parameter value and the problem resolution times. The system further comprises an ordering unit configured to order the operational parameter values within a cluster and the elements having caused the problem situation, according to the problem resolution times of the elements having caused the problem situation. The system further comprises the clustering unit and the ordering unit configured to periodically perform the clustering and the ordering such that a sequence of the operational parameter values and the elements having caused the problem situation is indicative of a resolution time required for a new problem situation.

In yet another aspect, a computer program product for clustering operational parameter values in a micro-service architecture used in a computing infrastructure is provided. The computer program product comprises a computer readable storage medium having program code embodied therewith. The program code is executable to: measure a plurality of operational parameter values of elements of the computing infrastructure; log identifiers for elements having caused a problem situation and related problem resolution times; cluster the operational parameter values of the elements having caused the problem situation, according to a correlation function between the operational parameter value and the problem resolution times; order the operational parameter values within a cluster and the elements having caused the problem situation, according to the problem resolution times of the elements having caused the problem situation; and periodically perform the clustering and the ordering such that a sequence of the operational parameter values and the elements having caused the problem situation is indicative of a resolution time required for a new problem situation.

DETAILED DESCRIPTION

Figure 1:
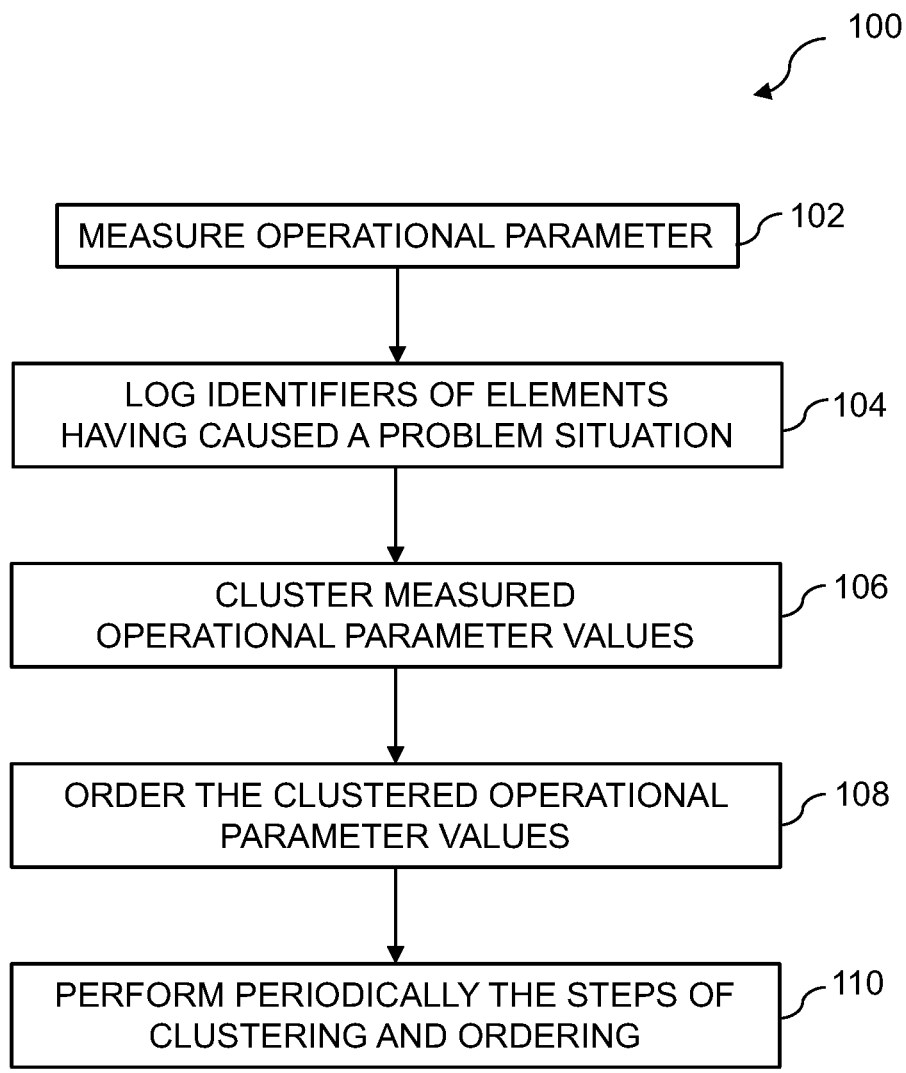
FIG. 1 shows a block diagram of a method for clustering operational parameter values in a micro-service architecture used in a cloud computing system, in accordance with one embodiment of the present invention.

In the context of this description, the following conventions, terms and/or expressions may be used.

The term "micro-service architecture" may denote a specialization of an implementation approach for service-oriented architectures (SOA) used to build flexible, independently deployable software systems. Services in a micro-service architecture (MSA) are software processes that communicate with each other over a network to fulfill a goal. These micro-services use technology-agnostic protocols. The micro-services approach is a first realization of SOA (service oriented architecture) that followed the introduction of DevOps (development integrated operation) and is becoming more popular for building continuously deployed systems.

In a micro-services architecture, services may have a high granularity and the protocols should be lightweight. A central micro-services property that appears in multiple definitions is that services may be independently deployable. The benefit of distributing different responsibilities of the system into different smaller services is that it enhances the cohesion and decreases the coupling. This makes it easier to change and add functions and qualities to the system at any time. It also allows the architecture of an individual service to emerge through continuous refactoring, and hence may reduce the need for a big up-front design and allows for releasing software early and continuously.

The term "operational parameter value" may denote one of a large variety of parameters and their respective values being generated during the uptime (or even down time) of computing resources. They may relate to computing resources, networking resources, storage resources, all of which may be software defined, i.e., also virtual resources, as well as software components. An example for an operational parameter of the software component may be the time of execution as well as the execution time, data accessed as well as the source from which the software component may have been activated. In the context of system administration operation, the term "metric" may be used interchangeably with the term operation parameter and their respective values.

The term "elements" may denote any identifiable active or passive component of a computer system (hardware and software), in particular a plurality of computing resources in a cloud computing environment. This may comprise all physical devices as well as virtual devices instrumental in delivering services from a cloud computing data center.

The term "service" may denote, in the context of software architecture, service-orientation, and service-oriented architecture, a software functionality or a set of software functionalities (such as the retrieval of specified information or the execution of a set of operations) with a purpose that may be reused by different clients for different purposes, together with the policies that may control its usage (based on the identity of the client requesting the service, for example). According to a well-known definition "service" may be defined as "a mechanism to enable access to one or more capabilities, where the access is provided using a prescribed interface and is exercised consistently with constraints and policies as specified by the service description." For a more thorough definition of a service in a cloud computing environment, see below.

The term "infrastructure components" may denote computer resources, network resources, and storage resources. Additionally, environmental infrastructure components may be included as well, including environmental conditions as well as related facility management components like climate data (humidity, temperature, etc.).

The term "cluster" may denote a group of metrics or operational parameters having similar behavior that is responding in a similar manner to certain system change.

The term "clustering" may denote a building of data cluster based on data mining and/or statistics methods.

The term "cloud computing" may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models and four deployment models.

Essential Characteristics of cloud computing comprise:

(i) On-demand self-service: A consumer can unilaterally provision computing capabilities, such as server time and network storage, as needed automatically without requiring human interaction with each service provider.

(ii) Broad network access: Capabilities are available over the network and accessed through standard mechanisms that promote use by heterogeneous thin or thick client platforms (e.g., mobile phones, laptop computers, tablet computers, and PDAs).

(iii) Resource pooling: The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

(iv) Rapid elasticity: Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured service: Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing used comprise:

(i) Cloud Software as a Service (SaaS): The capability provided to the consumer is to use the provider's applications running on a cloud infrastructure. The applications are accessible from various client devices through a thin client interface such as a Web browser (e.g., Web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

(i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services, e.g., a cloud service provider.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness, low coupling, modularity, and semantic interoperability.

The present invention for clustering operational parameter values in a micro-service architecture used in a cloud computing system may offer multiple advantages and technical effects.

The present invention enables operational staff and problem resolution teams to directly tackle problematic areas of micro-services and their related infrastructure components based on experiences made during previous program resolutions. The problem resolution time is no longer only dependent on the experience of the system engineer trying to resolve an incident. However, a method of the present invention adapts itself to an existing computing landscape (e.g., cloud computing environment) comprising a large plurality of infrastructure components, thousands of services offered to end-users, wherein the services are built from an underlying pool of cross-linked micro-services, out of which services offered to end-users may be composed.

By clustering the measured operational parameter values, isolating dependencies and relationships among them by using statistical methods and sophisticated data analytics tools, and also taking into account problem resolution times of previous problem situations, a staff member responsible for resolving an issue will have access to the collective wisdom of earlier successful incident resolutions. The staff member no longer has to only rely on his own experience but may use the experience made by a plurality of staff members which have dealt with problems and resolutions earlier.

The method and the related system of the present invention will direct administrators directly to those components of the computing environment and to those micro-services having a high probability for a short problem resolution time if an analysis and problem resolution is started from the name component and/or micro-service. This may help to reduce problem resolution times significantly, enabling an increased availability-time of the computing systems and its components as well as increasing the enterprise productivity.

Furthermore, the present invention may help to identify weak spots and critical parts among the involved infrastructure components to reveal non-obvious dependencies and avoid them in the future.

In the following, embodiments of the present invention will be described.

According to one embodiment of the present invention, each of the elements may be selected out of the group comprising services, micro-services, and infrastructure components of the cloud computing systems. At a top level, the services offered may be directed and offered to end-users. The services may be a component of a larger application. The micro-services may be deployed at any level of the micro-services architecture.

According to another embodiment of the present invention, the operational parameters and respective operational parameter values may be selected out of the group comprising time of execution and execution time of a micro-service, an identifier of a related virtual and physical machine, memory usage, communication delays, memory I/O rate, identifier of a related storage system, related I/O times and values, system latency, and system response time. A skilled person will understand that the operational parameters mentioned here may represent only a fraction of operational parameter values for a much broader variety of operational conditions. Basically, any parameter or parameter value collected and stored by a systems monitoring and/or management may be usable as an operational parameter in the sense of this document.

According to another embodiment of the present invention, the determination of the correlation function may apply to at least one of a statistical function and a data mining algorithm on the measured operation parameters. Such an approach may allow identifying a pattern in the collected data (i.e., operational parameter values) and finding correlations and dependencies between the measured operational parameter values and finally reduce the problem resolution time. In particular, a correlation may be found between logged resolution records comprising information about past problem situations, root causes and resolution times on the one side, and measured operational parameter values on the other side.

According to yet another embodiment of the present invention, the clustering may also take into account geographic location information of an execution of the elements or a top-level service being called. This may enhance the usability (i.e., a user/admin friendly classification of the measured operational parameter values) and a better overview of proposed starting points (i.e., a specific element of the cloud computing environment) for a problem resolution.

According to yet another embodiment of the present invention, a naming of the operational parameters and their respective values may follow a naming (in particular a naming algorithm) of the element. Each element in the cloud computing environment may follow a predefined naming convention. One example for a naming convention may be <organization-prefix>.<environment>.<region>.<service>. <plan>.<post-name>.<metric-name[-instance]>.

It may be noted that typical development environments for the type of computing environments addressed here may have its own schema for a naming. However, the naming convention itself may not matter; only the existence of such a naming convention may improve the usability of the method and the system of the present invention.

According to yet another embodiment of the present invention, the infrastructure components may comprise at least one selected from the group comprising a physical server system, a CPU type (central processing unit), a memory amount, a network connection, a storage system, a rack used for the physical server system, GPU (graphics processing unit) type, and special-purpose accelerator (e.g., crypto accelerator or a mathematical and/or statistical engine for data mining). Thus, all typical elements of larger computing environments such as cloud computing environments may be addressed. It may be understood that the list given may not be complete and may be understood as an exemplary list only. For example, network switches and cooling devices may also be counted as infrastructure components.

According to yet another embodiment of the present invention, the logged identifiers for elements having caused a problem situation may be generated and/or derived from problem situation resolution records, i.e., from incident resolution records. Thus, the history, in particular the history of resolved problems, may be used to increase the success rate of incident management and thus reduce the time required for problem resolutions.

According to yet another embodiment of the present, each of the elements may comprise or may have a related counter assigned to it indicative of having been a source for a resolved problem situation in the past. Thus, each time one of the elements of the cloud computing environment have been identified as a source for an incident or a problem situation, the related counter may be increased. Based on this, the above-mentioned statistical and/or data mining techniques may be enabled to identify the pattern within the sources. The naming source may be an element of the cloud computing environment or its service may be provided by a system management tool.

According to yet another embodiment of the present, a naming schema for at least a portion of the plurality of operational parameter may be available from an operational parameter naming source. This may be related to an operational platform of framework for underlying micro-services for the cloud computing services. Such platforms exist in the industry and are provided by different vendors.

In the following, detailed description of the figures will be given. All instructions in the figures are schematic. Firstly, a block diagram of an embodiment of the present invention for clustering operational parameter values in a micro-service architecture used in a cloud computing system is given. Afterwards, further embodiments, as well as embodiments of the system for clustering operational parameter values in a micro-service architecture used in a cloud computing system, will be described.

FIG. 1 shows a block diagram of method 100 for clustering operational parameter values in a micro-service architecture used in a cloud computing system, in accordance with one embodiment of the present invention. It may be noted that the operational parameter and related values may also be denoted as metrics. Method 100 comprises measuring a plurality of operational parameter values of elements of the cloud computing system (block 102). Typical elements have been mentioned in previous paragraphs of this document.

Method 100 further comprises logging identifiers for elements having caused a problem situation in the past and related problem resolution times (block 104). These problem resolution times along with other data in the context of the problem resolution may be logged in a resolution record. This, alongside the measured and stored operational parameter values, build the basis for the self-learning capability of the method and the related system based on statistical and/or analytical methods or data mining technologies.

As shown in block 106, method 100 further comprises clustering the measured operational parameter values together with the related elements according to a determined correlation function between a measured operational parameter value and a resolution time of a problem situation. The correlation function including its parameters may be derived from applying statistical methods and data mining technologies (including related coprocessors) to the measured, collected, and stored data (i.e., the operational parameter values as well as the resolution records).

Method 100 further comprises ordering the clustered operational parameter values within a cluster and the related elements according to the logged problem resolution times of the elements (block 108). As shown in block 110, method 100 further comprises periodically performing clustering and ordering such that a sequence of the ordered clustered operational parameter values and the related elements is indicative of a resolution time required for a new problem situation. The periodicity of these actions may be according to actual problem resolutions; for example, after each problem resolution, the method may be executed again. This may have the advantage that the data for the next problem resolution may always be current. In other implementations, the update of the clustered data and the ordering may be performed at predefined times.

Figure 2:
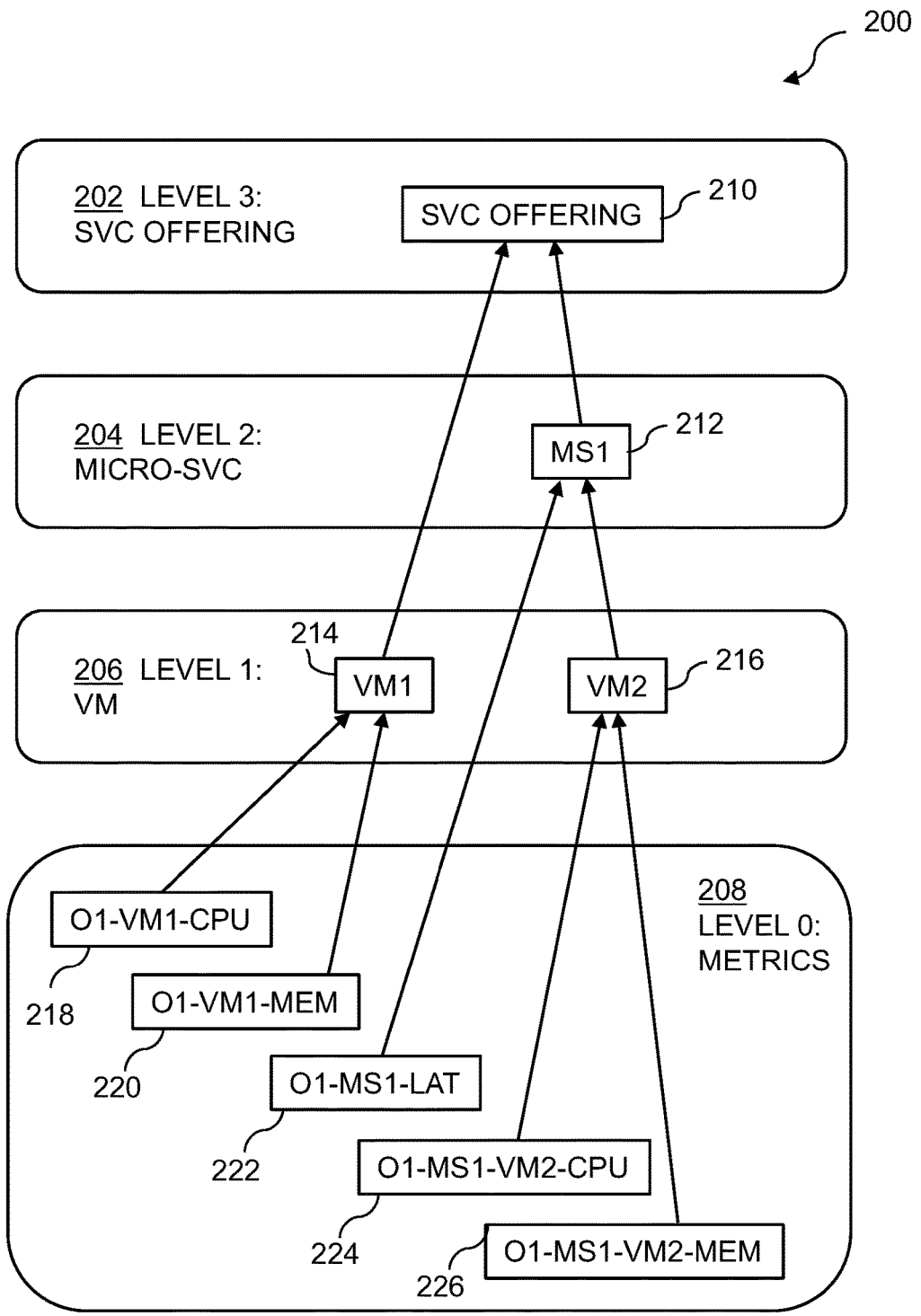
FIG. 2 shows an architecture comprising four different levels, in accordance with one embodiment of the present invention.

FIG. 2 shows architecture 200 comprising four different levels, in accordance with one embodiment of the present invention. On the top level, level 3 (202), service offering 210 of the cloud computing center in the form of a callable function is shown. This service offering or service function which may be an end-user function from an email or content management system, a transaction system (e.g., any enterprise application), as well as a systems monitoring and management application.

In the shown example, service offering 210 may be a provisioning of a virtual machine, e.g., VM1 (214) shown on architecture level 1 (206). Additionally, a cost calculation micro-service MS1 (212) may run in parallel in order to build the user for the usage of VM1 (214). The cost calculation micro-service MS1 (212) is shown on architecture level 2 (204). It may be executed using virtual machine VM2 (216).

It is noted that service offering 210 visible to end-users may include a much more complex cross-dependent network of micro-services of level 2 (204). Only for comprehensibility reasons, the given example is reduced to a minimum functionality.

On level 0 (208), physical components together with operational parameter values for fulfilling service offering 210 are shown. Here, a plurality of operational parameters of all kind may be measured, collected and stored. In an initial status, the operational parameter values may only be collected for later analysis and assessment; in particular, in a situation when service offering 210 cannot be performed and/or executed as expected according to potentially existing service level agreements.

For example, the following parameters are shown: CPU type 218 is executed on VM1 (numeral 214) to provide service offering 210 (indicated by O1). In the same nomenclature, VM1's memory usage 220, MS1's latency 222 (basically the time required to execute MS1 212), CPU type 226 used to execute VM2 216, and related memory requirements 226 are shown. For a skilled person, it is obvious that these operational power meter and related values shown may only be a fraction of measured and collected operational parameter values. However, the general principle of the here proposed concepts should become clear using this limited number of operational parameters and respective values.

Figure 3:
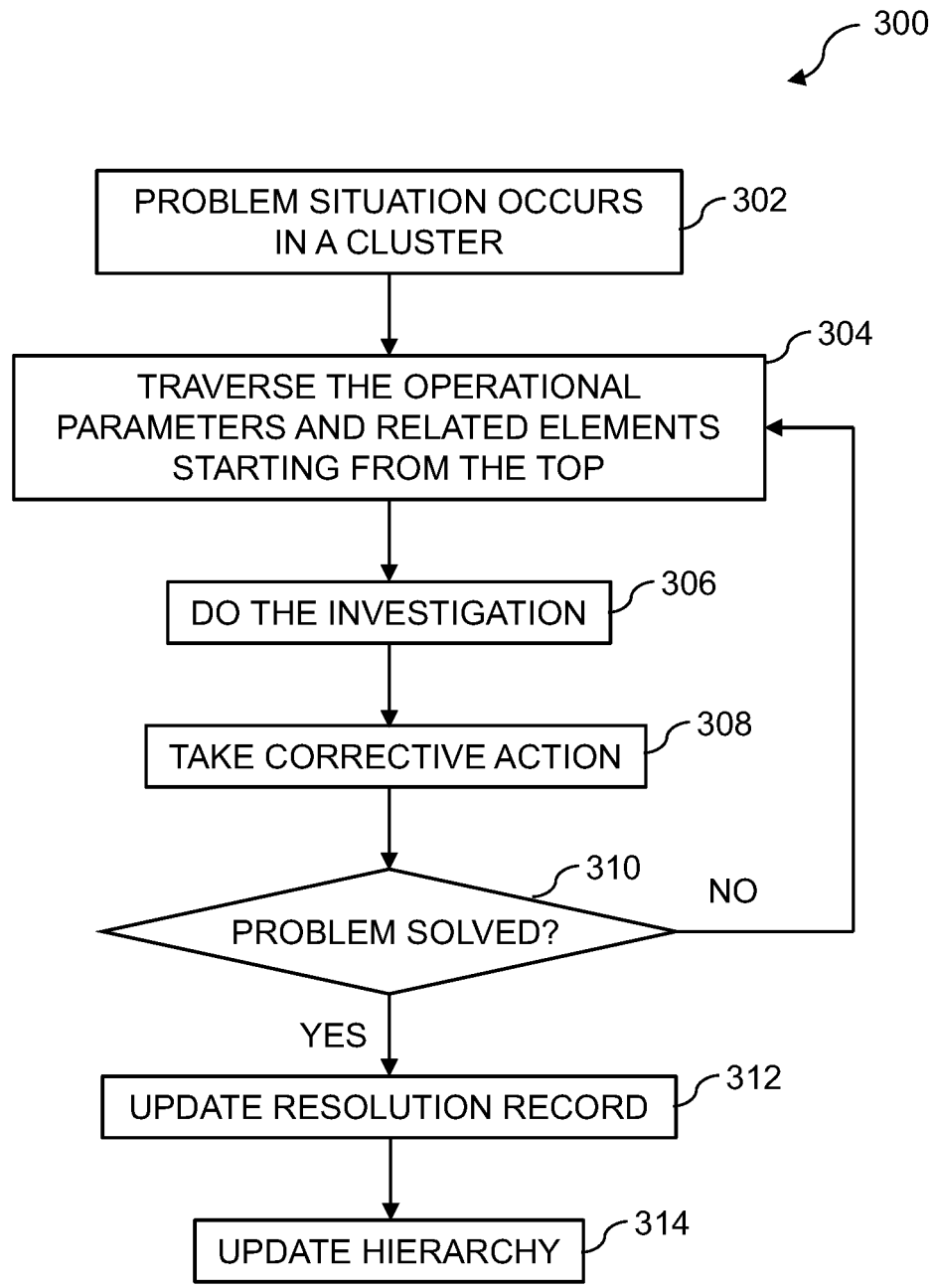
FIG. 3 shows a sequence of actions and steps performed in a typical problem resolution case, in accordance with one embodiment of the present invention.

FIG. 3 shows sequence 300 of actions and steps performed in a typical problem resolution case, in accordance with one embodiment of the present invention.

At step 302, a problem situation occurs in a cluster related to service offering 210 (shown in FIG. 2) of a cloud computing environment. The problem or incident is reported or logged, e.g., at a support desk. The problem or incident may be logged against service offering 210, a related micro-service (for example, MS1 212 shown in FIG. 2) also against a virtual machine. Basically, the problem or incident may be logged against any element of any of the architecture levels 0 to 3 shown in FIG. 2.

The next step is to resolve the problem. Typically, the incident or problem is assigned to a systems engineer or administrator for problem resolution. Because of the proposed system and method, the systems engineer does not have to rely on his experience when manually analyzing the operational parameter relating to a cluster. Instead, an ordered sequence of elements of the cloud computing environment, providing service offering 210 for a given cluster is provided as a decision basis for the systems engineer to start with the problem resolution. It is noted that the problem resolution may also be tried an automated way using scripts or other machine-based actions.

However, in case a systems engineer is responsible for the resolution of the problem, the systems engineer will start with the element positioned at the leftmost or top position of the ordered list of operational parameters and related elements relating to the technical cluster of elements providing service offering 210. Based on the proposed method, the systems administrator can assume that, when tackling the problem starting with the element having the highest priority (top position) in the ordered sequence of the ordered clustered operational parameter values and related elements, the problem resolution time may require the smallest time amount. Thus, at step 304, the systems administrator will traverse the operational parameter list sequence and related elements starting from the top.

At step 306, the systems administrator will do the investigation of the reported problem situation. At step 306, the systems administrator may take corrective actions. If the problem is not solved (NO of block 310), the systems administrator will go back to the list of elements potentially causing the reported problem and continue with the next element in the list.

If the problem is solved (YES case of block 310), at step 312, the resolution record will be updated with the element of the cloud computing environment having caused the problem including the resolution time as well as other relevant operational parameter values and notes about observations of the problem resolution engineer.

At step 314, the hierarchy of the operational parameters may be updated based on the new resolution record content. It is noted that step 314 may also happen at a later point in time, e.g., at any predetermined time according to a time schedule for updating the hierarchy of operational parameters. This way, the sequence of operational parameters in the list reflects a self-learning mechanism always indicating those elements and the cloud computing environment enabling a problem resolution potentially requiring the smallest amount of time for resolving the underlying problem reported.

Figure 4:
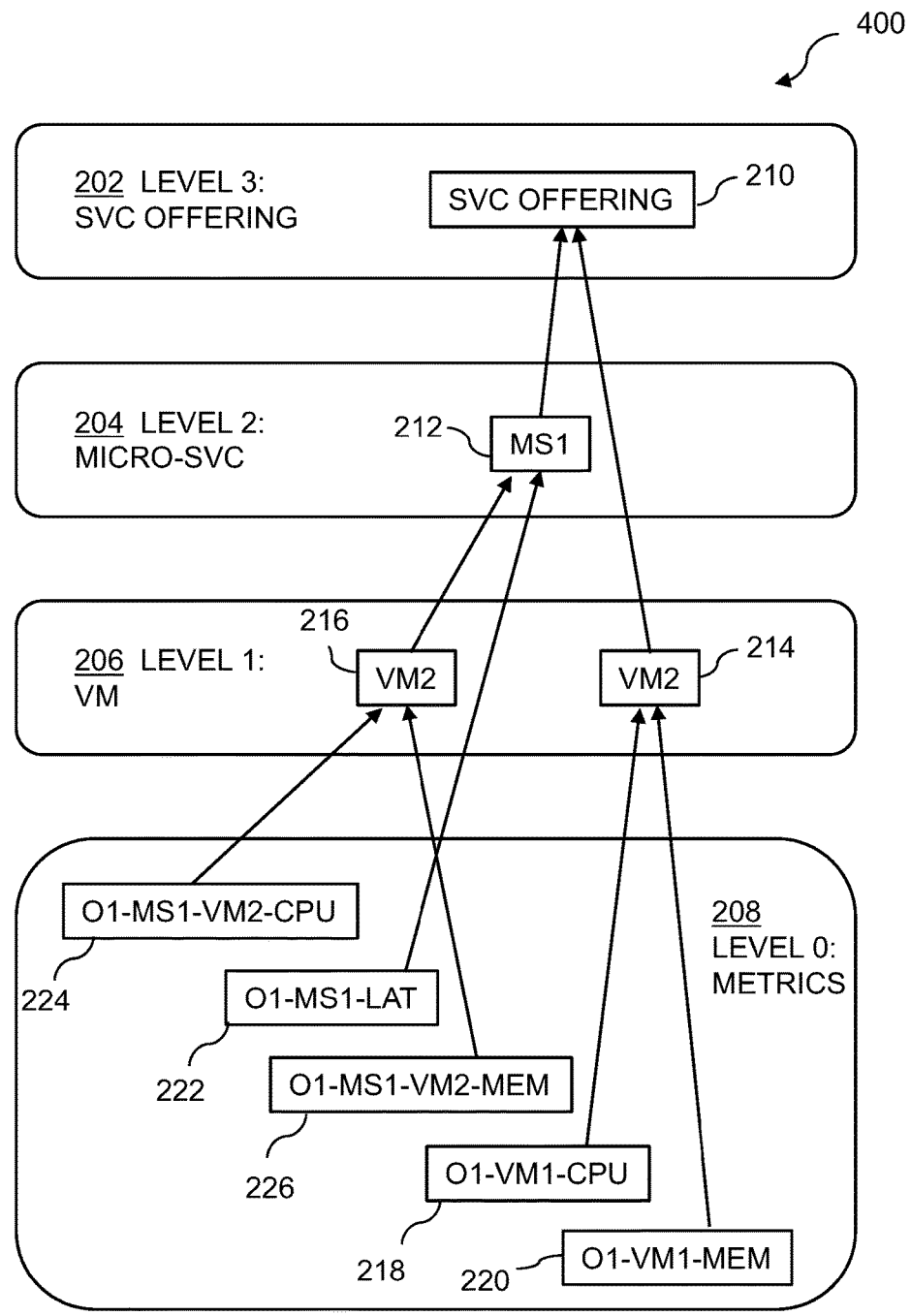
FIG. 4 shows an ordered list of operational parameters and their respective values in a different order and with different dependency arrows shown in FIG. 2, in accordance with one embodiment of the present invention.

FIG. 4 shows ordered list 400 of operational parameters and their respective values 224, 222, 226, 218, and 220 in a different order and with different dependency arrows shown in FIG. 2, in accordance with one embodiment of the present invention. Without discussing elements that have been already mentioned in FIG. 2, it becomes obvious that the sequence of operational parameter values shown in FIG. 4 is different from the sequence shown in FIG. 2, if the sequence from left to right or from top to bottom of the operational parameters of level 0 (208) is indicative of root causes for a problem or incident situation relating to service offering 210.

This adapted sequence of operational parameters 224, 222, 226, 218, and 220 is the result of the clustering and ordering process discussed in the context of FIG. 1 and FIG. 3. For a system administrator, trying to resolve a reported problem situation relating to service offering 210, the sequence of operational parameters (in particular, having the operational parameter O1-MS1-VM2-CPU 224 being positioned at the leftmost position or the top position of all operational parameter values) gives a clear indication to start with an investigation of the CPU and the related physical server executing VM2 216, which is the basis for micro-service MS1 212, in the problem resolution process. Starting with operational parameter 224 or the respective element (here the CPU) has a high probability that the problem resolution time will be kept at a minimum if compared to starting with one of the other elements of the cloud computing environment to provide service offering 210.

Figure 5:
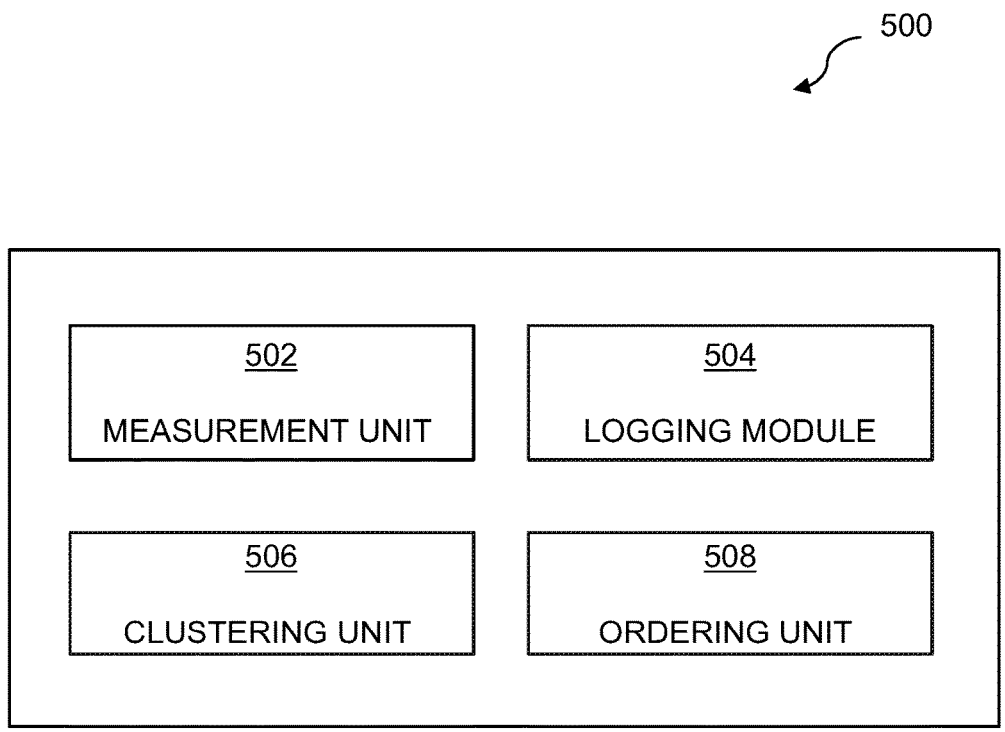
FIG. 5 shows a system for clustering operational parameter values in a micro-service architecture used in a cloud computing environment, in accordance with one embodiment of the present invention.

FIG. 5 shows system 500 for clustering operational parameter values in a micro-service architecture used in a cloud computing environment, in accordance with one embodiment of the present invention. System 500 comprises measurement unit 502 configured to measure a plurality of operational parameter values of elements of the cloud computing system. System 500 further comprises logging module 504 configured to log identifiers for elements having caused a problem situation and related problem resolution times. Furthermore, system 500 comprises clustering unit 506 configured to cluster the measured operational parameter values together with the related elements according to a determined correlation function between a measured operational parameter value and a resolution time of a problem situation. System 500 further comprises ordering unit 508 configured to order the clustered operational parameter values within a cluster and the related elements according to said logged problem resolution times of the elements. Clustering unit 506 and ordering unit 508 are configured to periodically become active such that a sequence of said ordered clustered operational parameter values and the related elements is indicative of a resolution time required for a new problem situation. This may happen at predetermined times, or it may be triggered by an input signal (e.g., from a user), or after or before a problem resolution, i.e., before and/or after an incident or problem situation.

Figure 6:
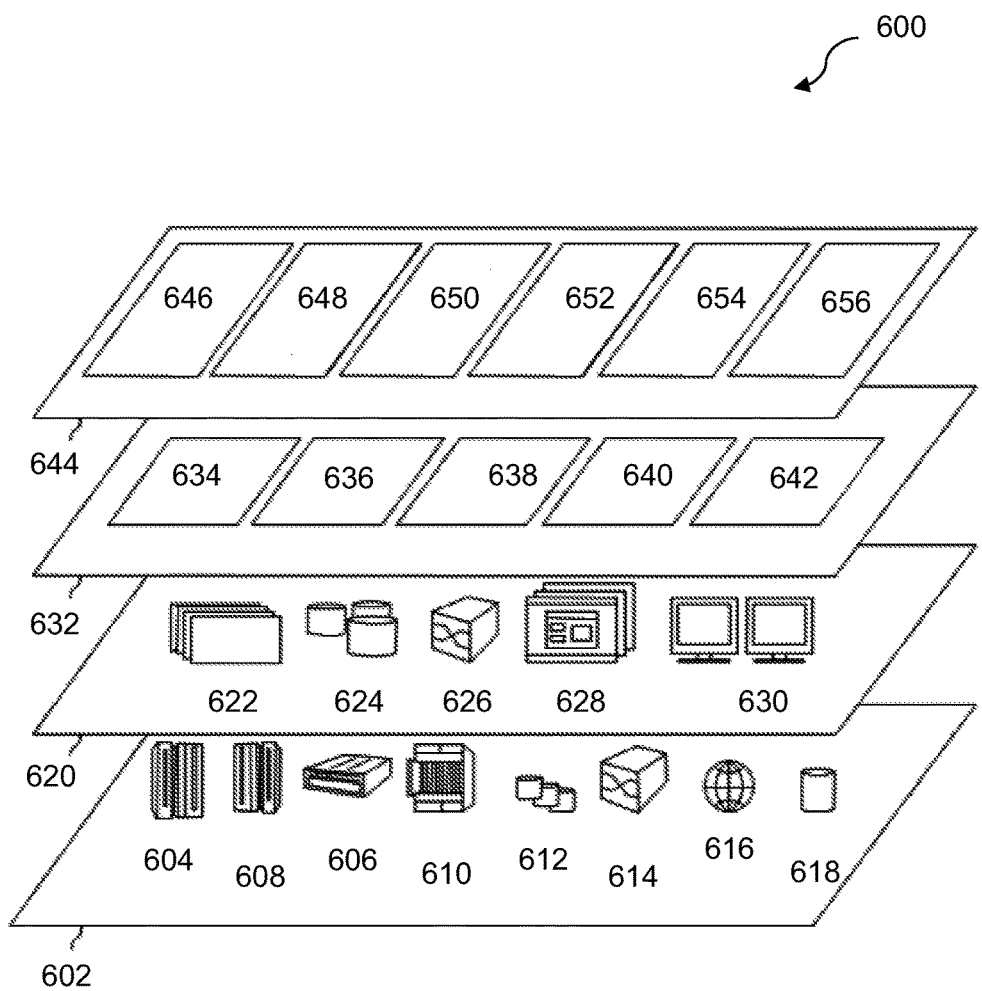
FIG. 6 shows a cloud computing environment in which at least parts of the present invention is deployed, in accordance with one embodiment of the present invention.

FIG. 6 shows cloud computing environment 600 in which at least parts of the present invention is deployed, in accordance with one embodiment of the present invention. A set of functional abstraction layers provided by a cloud computing environment is shown. It should be understood in advance that the components, layers, and functions shown in FIG. 6 are intended to be only illustrative and embodiments of the invention are not limited thereto. As depicted, the following layers and corresponding functions are provided: hardware and software layers 602 include hardware and software components. Examples of hardware components include: mainframes 604, servers 606, RISC (Reduced Instruction Set Computer) architecture-based servers 608, blade servers 610, storage devices 612, networks and networking components 614. In some embodiments, software components include network application server software 616 and/or database software 618.

Virtualization layer 620 provides an abstraction layer from which the following examples of virtual entities may be provided: virtual servers 622, virtual storage 624, virtual networks 626 (including virtual private networks), virtual applications and operating systems 628, and virtual clients 630. In one example, management layer 632 may provide the functions described below. Resource provisioning 634 provides dynamic procurement of computing resources and other resources that are utilized to perform tasks within the cloud computing environment. Metering and pricing 636 provides cost tracking as resources are utilized within the cloud computing environment, and billing or invoicing for consumption of these resources. In one example, these resources may comprise application software licenses. Security provides identity verification for cloud consumers and tasks as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provides pre-arrangement for, and procurement of, cloud computing resources for which a future requirement is anticipated in accordance with an SLA.

Workload layer 644 provides examples of functionality for which the cloud computing environment may be utilized. Examples of workloads and functions which may be provided from this layer include: mapping and navigation 646, software development and lifecycle management 648, virtual classroom education delivery 650, data analytics processing 652, transaction processing 654, and the system for clustering operational parameter values in a micro-service architecture used in cloud computing system 656.

Embodiments of the present invention may be implemented together with virtually any type of computer, regardless of the platform being suitable for storing and/or executing program code.

Figure 7:
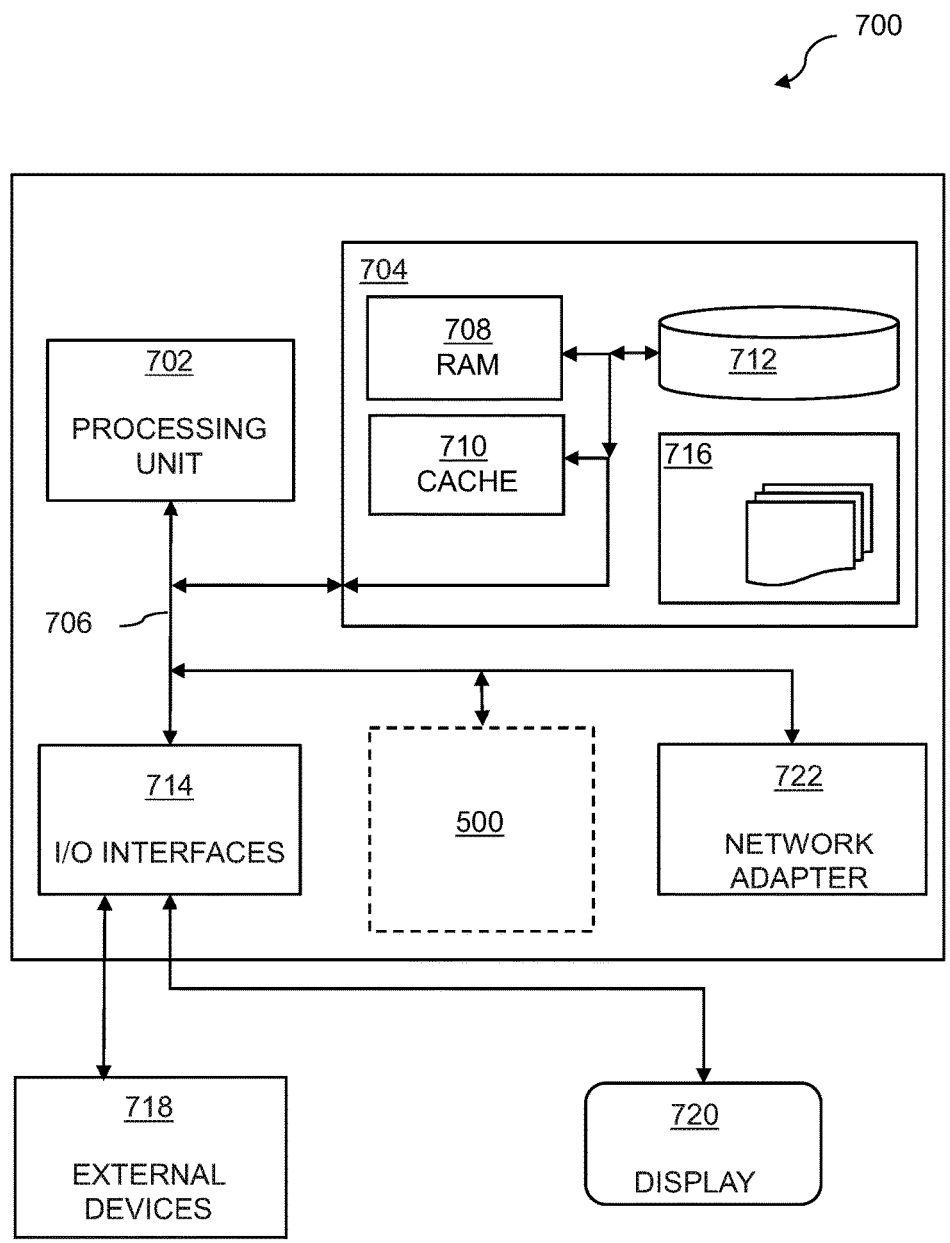
FIG. 7 is a diagram illustrating components of a computer system implementing the present invention, in accordance with one embodiment of the present invention.

FIG. 7 is a diagram illustrating components of computer system 700 implementing the present invention, in accordance with one embodiment of the present invention.

Computing system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In computer system 700, there are components, which are operational with numerous other general purpose or special purpose computing system environments or configurations. Examples of well-known computing systems, environments, and/or configurations that may be suitable for use with computer system 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 700 may be described in the general context of computer system-executable instructions, such as program modules, being executed by computer system 700. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system 700 is shown in the form of a general-purpose computing device. The components of computer system 700 may include, but are not limited to, one or more processors or processing units 702, system memory 704, and bus 706 that couples various system components including system memory 704 to processor 702. Bus 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 700 typically includes a variety of computer system readable media. Such media may be any available media that is accessible by computer system 700, and it includes both, volatile and non-volatile media, removable and non-removable media.

System memory 704 may include computer system readable media in the form of volatile memory, such as random access memory (RAM) 708 and/or cache memory 710. Computer system 700 may further include other removable/non-removable, volatile/non-volatile computer system storage media. By way of example only, storage system 712 may be provided for reading from and writing to a non-removable, non-volatile magnetic media (not shown and typically called a hard drive). Although not shown, a magnetic disk drive for reading from and writing to a removable, non-volatile magnetic disk (e.g., a floppy disk), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the present invention.

The program/utility, having a set (at least one) of program modules 716, may be stored in memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein.

Computer system 700 may also communicate with one or more external devices 718 such as a keyboard, a pointing device, display 720, etc., one or more devices that enable a user to interact with computer system 700, and/or any devices (e.g., network card, modem, etc.) that enable computer system 700 to communicate with one or more other computing devices. Such communication can occur via Input/Output (I/O) interfaces 714. Still yet, computer system 700 may communicate with one or more networks such as a local area network (LAN), a general wide area network (WAN), and/or a public network (e.g., the Internet) via network adapter 722. As depicted, network adapter 722 may communicate with the other components of computer system 700 via bus 706. It should be understood that although not shown, other hardware and/or software components could be used in conjunction with computer system 700. Examples include, but are not limited to: microcode, device drivers, redundant processing units, external disk drive arrays, RAID systems, tape drives, and data archival storage systems, etc.

Additionally, system 500 (shown in FIG. 5) for clustering operational parameter values in a micro-service architecture used in a cloud computing system may be attached to bus 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for clustering operational parameter values in a micro-service architecture used in a computing infrastructure, the method comprising:
    measuring a plurality of operational parameter values of elements of the computing infrastructure;
    logging identifiers for elements having caused a problem situation and related problem resolution times;
    clustering the operational parameter values of the elements having caused the problem situation, according to a correlation function between the operational parameter value and the problem resolution times;
    ordering the operational parameter values within a cluster and the elements having caused the problem situation, according to the problem resolution times of the elements having caused the problem situation;
    periodically performing the clustering and the ordering, such that a sequence of the operational parameter values and the elements having caused the problem situation is indicative of a resolution time required for a new problem situation; and
    wherein each of the elements comprises a related counter indicative of being a source for a resolved problem situation.

2. The method of claim 1, wherein each of the elements is selected from a group comprising services, micro-services, and infrastructure components of the computing infrastructure.

3. The method of claim 2, the infrastructure components comprise at least one of a physical server system, a CPU type, a memory amount, a network connection, a storage system, a rack used for a physical server system, GPU type, and a special-purpose accelerator.

4. The method of claim 1, wherein the operational parameter values are selected from a group comprising time of execution and execution time of a micro-service, an identifier of a related virtual and physical machine, memory usage, communication delays, memory I/O rate, identifier of a related storage system, related I/O times and values, system latency, and system response time.

5. The method of claim 1, wherein the correlation function is derived from at least one of a statistical function and a data mining algorithm on operational parameters.

6. The method of claim 1, wherein the clustering uses geographic location information of the elements or a top-level service.

7. The method of claim 1, wherein a naming of operational parameters follows a naming of the elements.

8. The method of claim 1, wherein the identifiers are generated from problem situation resolution records.

9. The method of claim 1, wherein a naming schema for at least a portion of a plurality of operational parameters is available from an operational parameter naming source.

10. A computer system for clustering operational parameter values in a micro-service architecture used in a computing infrastructure, the computer system comprising:

one or more processors, one or more computer readable tangible storage devices, and program instructions stored on at least one of the one or more computer readable tangible storage devices for execution by at least one of the one or more processors, the program instructions executable to:

measure a plurality of operational parameter values of elements of the computing infrastructure;

log identifiers for elements having caused a problem situation and related problem resolution times;

cluster the operational parameter values of the elements having caused the problem situation, according to a correlation function between the operational parameter value and the problem resolution times;

order the operational parameter values within a cluster and the elements having caused the problem situation, according to the problem resolution times of the elements having caused the problem situation;

periodically perform the clustering and the ordering, such that a sequence of the operational parameter values and the elements having caused the problem situation is indicative of a resolution time required for a new problem situation; and wherein each of the elements comprises a related counter indicative of being a source for a resolved problem situation.

11. The computer system of claim 10, wherein each of the elements is selected from a group comprising services, micro-services, and infrastructure components of the computing infrastructure.

12. The computer system of claim 11, the infrastructure components comprise at least one of a physical server system, a CPU type, a memory amount, a network connection, a storage system, a rack used for a physical server system, GPU type, and a special-purpose accelerator.

13. The computer system of claim 10, wherein the operational parameter values are selected from a group comprising time of execution and execution time of a micro-service, an identifier of a related virtual and physical machine, memory usage, communication delays, memory I/O rate, identifier of a related storage system, related I/O times and values, system latency, and system response time.

14. The computer system of claim 10, wherein the correlation function is derived from at least one of a statistical function and a data mining algorithm on operational parameters.

15. The computer system of claim 10, wherein the clustering uses geographic location information of the elements or a top-level service.

16. The computer system of claim 10, wherein a naming of operational parameters follows a naming of the elements.

17. The computer system of claim 10, wherein the identifiers are generated from problem situation resolution records.

18. A computer program product for clustering operational parameter values in a micro-service architecture used in a computing infrastructure, the computer program product comprising a computer readable storage medium having program code embodied therewith, the program code executable to:

measure a plurality of operational parameter values of elements of the computing infrastructure;

log identifiers for elements having caused a problem situation and related problem resolution times;

cluster the operational parameter values of the elements having caused the problem situation, according to a correlation function between the operational parameter value and the problem resolution times;

order the operational parameter values within a cluster and the elements having caused the problem situation, according to the problem resolution times of the elements having caused the problem situation;

periodically perform the clustering and the ordering, such that a sequence of the, operational parameter values and the elements having caused the problem situation is indicative of a resolution time required for a new problem situation; and wherein each of the elements comprises a related counter indicative of being a source for a resolved problem situation.

* * * * *